United States Patent Office 3,748,143
Patented July 24, 1973

3,748,143
NON-AQUEOUS EMULSIONS
Wayne A. Bowman, Rochester, N.Y., assignor to
Eastman Kodak Company, Rochester, N.Y.
No Drawing. Filed Feb. 1, 1972, Ser. No. 222,661
Int. Cl. G03c 1/04
U.S. Cl. 96—114                    14 Claims

ABSTRACT OF THE DISCLOSURE

Non-aqueous photographic silver halide emulsions are prepared by an improved process comprising:
(A) introducing the respective silver and halide reactants into an aqueous medium comprising an amphiphilic polymer which comprises units of an (N,N-dialkylamino)alkyl (alk)acrylate,
(B) coagulating the silver halide out of the liquid medium,
(C) removing the aqueous liquid and
(D) redispersing the silver halide in a water-miscible, non-aqueous medium, wherein the improvement comprises:
(E) introducing into this non-aqueous dispersion, a polymer comprising:
  (1) about 90–50% by weight of units of an alkyl (alk)acrylate,
  (2) about 10–50% by weight of units of a monomer containing at least one anionic group and
  (3) up to about 10% by weight of units of a monomer containing at least one active methylene group, in a quantity sufficient to re-coagulate the silver halide,
(F) removing the non-aqueous liquid containing residual moisture, and
(G) redispersing the silver halide in a non-aqueous medium in the presence of a polymer comprising:
  (1) about 90–50% by weight of units of an alkyl (alk)acrylate,
  (2) about 50–10% by weight of units of a monomer containing at least one anionic group, and
  (3) up to about 10% by weight of units of a monomer containing at least one active methylene group, this polymer being present in a quantity great enough to effect the redispersion, which quantity is greater, on a molar basis, than the quantity necessary for the re-coagulation.

This invention relates to an improved process wherein a silver salt is prepared in an aqueous dispersion in the presence of a first polymeric compound and is subsequently dispersed in a non-aqueous medium in the presence of a second polymeric compound.

It is known in the art to prepare silver halide salts in an aqueous medium in the presence of synthetic polymers, such as described in Priest et al., U.S. Pat. 3,003,879, issued Oct. 10, 1961, Smith et al., U.S. Pat. 3,615,624, issued Oct. 26, 1971 and Belgian Pat. 561,161 granted Oct. 15, 1957. Generally, the polymeric peptizers used in the preparation of the silver salt are sufficiently soluble in aqueous media to prevent clumping of the silver grains. However, in many instances, the peptizer is not soluble in organic media and the petitized silver halide can be coagulated by the addition of organic solvents such as disclosed in Belgian Pat. 561,161. In certain instances where the polymeric peptizers are soluble in water and can be redispersed after the precipitation in a non-aqueous medium, it was found that they were limited in application to certain emulsion-making conditions. A solution to this problem was set forth in Hollister et al., U.S. Ser. No. 84,920, filed Oct. 28, 1970, now Pat. No. 3,706,564 wherein a multisolvent system for preparing silver salt dispersions which can be used to produce photographic silver salt dispersions under a wide variety of conditions such as single-run procedures, double-run procedures, procedures using ripening agents, procedures using controlled pH and pAg and the like was disclosed. Generally, it was found that when a polymer peptizer, such as a copolymer comprising units of an (N,N-dialkylamino)alkyl acrylate with units of alkyl acrylates and optionally with units of ethylenically unsaturated monomers having thioether moieties in groups appended thereto, was used in the precipitation medium of the silver salt, silver halides could be precipitated in aqueous or non-aqueous solvent media, and after coagulation could be redispersed in either aqueous or non-aqueous media.

In general, the foregoing procedure has worked well. However, it will be noted that where the initial precipitation is from an aqueous medium and the re-dispersion is in a non-aqueous medium, a certain amount of water will be carried along with the precipitate and thus be present in the non-aqueous dispersion. In many applications, such moisture will do no harm, but in other instances, e.g. some photographic articles of manufacture, undesirable phenomena, for example, "blushing," i.e., a whitening in the presence of water, can occur. For such applications, a means for significantly reducing the amount of water present in the non-aqueous dispersion is needed.

While the synthetic polymeric materials described in Ser. No. 84,920 supra, are excellent peptizers for photographic silver halide emulsions, for most applications it will usually be desirable, and often necessary, that a second polymeric material be added to the system at some point in the process to act as a vehicle or binder. Such a binder must be compatible with the peptizing polymer, must be substantially soluble in the non-aqueous medium and must produce no significant harmful effects in the final product. It would be particularly desirable if a material possessing these properties could be found for use as a binder which would, at the same time, provide a means whereby removal of water, as set forth above, could be accomplished.

It is, therefore, an object of this invention to provide a process whereby water can be removed from moisture-containing, non-aqueous photographic emulsions.

It is a further object of this invention to provide binders or vehicles suitable for use in non-aqueous photographic emulsions.

It is another object of this invention to provide synthetic polymeric materials which can be employed to remove residual water from moisture-containing, non-aqueous photographic emulsions and which can thereafter be employed as a suitable binder or vehicle for the emulsion.

These and other objects, which will be apparent from the following description, are accomplished by the practice of the present invention which comprises an improved process for preparing a non-aqueous photographic silver halide emulsion comprising re-coagulation and redispersion steps in the presence of one or more synthetic polymers comprising an alkyl (alk)acrylate, a monomer containing at least one active methylene group. More particularly, the present invention comprises an improved process for preparing a non-aqueous photographic silver halide emulsion, said process comprising: (A) introducing the respective silver and halide reactants into an aqueous medium comprising an amphiphilic polymer which comprises units of an (N,N-dialkylamino)alkyl (alk)acrylate, (B) coagulating the silver halide out of the liquid medium, (C) removing the aqueous liquid and (D) redispersing said silver halide in a water-miscible non-aqueous medium comprising an amphiphilic polymer which troducing into the non-aqueous dispersion a polymer comprising: (1) about 90–50% by weight of units of an alkyl (alk) acrylate, (2) about 10–50% by weight of units of a polymerized monomer containing at least one anionic group and (3) up to about 10% by weight of units of a monomer containing at least one active methylene group, in a quantity sufficient to re-coagulate the silver halide, (F) removing the water-miscible, non-aqueous liquid containing residual moisture, (G) redispersing said silver halide in a non-aqueous medium in the presence of a polymer comprising: (1) about 90–50% by weight of units of an alkyl (alk)acrylate, (2) about 50–10% by weight of units of a monomer containing at least one anionic group, and (3) up to about 10% by weight of units of a monomer containing at least one active methylene group, said polymer being present in a quantity great enough to effect said redispersion, said quantity being greater, on a molar basis, than the quantity necessary for said re-coagulation. The dispersion can then be coated onto a support.

The coagulation steps in this process can be carried out by any convenient means known in the art. Coagulation by means of pH adjustment has been found to be especially desirable, however, and is preferred.

The polymers which are employed as the peptizers in the practice of this invention comprise units of (N,N-dialkylamino)alkyl (alk)acrylates. It is understood that the term "(alk)acrylates" is used herein as a generic term to encompass acrylates as well as alpha,alkyl-substituted acrylates, such as, for example, methacrylates, ethacrylates, propacrylates, butacrylates and the like. Typical preferred compounds of this type are represented by the formula:

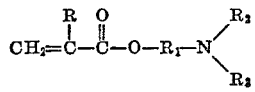

wherein R is a hydrogen atom or a lower alkyl group e.g. methyl, ethyl, propyl, butyl and the like, preferably methyl; $R_1$ is an alkylene group preferably containing from 1 to 8 carbon atoms, including branched-chain alkylene groups such as methylene, ethylene, propylene, trimethylene, butylene, isobutylene and the like; $R_2$ and $R_3$ are alkyl groups of from 1 to 6 carbon atoms, including branched-chain alkyl groups or aryl groups of from 6 to 15 carbon atoms such as phenyl, substituted phenyl, naphthyl and the like.

In a preferred embodiment, the polymeric peptizer comprises from 0 to 20 mole percent of units of an ethylenically unsaturated monomer containing groups appended thereto comprising at least one thioether moiety, from about 35 to 75 mole percent of units of alkyl (alk) acrylate and from 25 to 65 mole percent of a (N,N-dialkylamino)alkyl (alk)acrylate.

In a highly preferred embodiment, the polymeric peptizer comprises units of 2-(N,N-dimethylamino)ethyl methacrylate.

The alkyl (alk)acrylates used in making the peptizer employed in this invention are generally referred to as unsubstituted (alk)acrylic esters (which form hydrophobic units when polymerized). Typical useful (alk)acrylic esters include methyl acrylate, ethyl acrylate, propyl acrylate, butyl acrylate, isopropyl acrylate, isobutyl acrylate, t-butyl acrylate, the respective methacrylates, and the like. Preferably, the alkyl (alk)acrylate is a simple compound, such as methyl acrylate or methyl methacrylate.

The polymeric peptizers employed in the practice of this invention can also comprise units of an ethylenically unsaturated compound comprising groups having thioether moieties or sulfide-sulfur atoms therein. In a preferred embodiment, these compounds include those derived from monomers of amides and esters of ethylenically unsaturated acids, including maleic acids, acrylic acids, methacrylic acids and the like, in which the respective amine and alcohol condensation residues in said amides and esters contain at least one organic group having at least one sulfide-sulfur atom linking two methylene groups (—CH$_2$—). Typical units of this type useful in certain embodiments according to this invention are disclosed in U.S. Pat. 3,615,624 which is incorporated herein by reference. These units can be obtained from monomers such as N-(3-thiabutyl)acrylamide;
N-(3-thiapentyl)acrylamide;
N-(4-methyl-2-thiapentyl)acrylamide;
N-(2,5-dimethyl-4-thiahexyl)acrylamide;
N-(5-thiaheptyl)acrylamide;
N-(4-thiaheptyl)acrylamide;
N-(6-methyl-4-thiaheptyl)acrylamide;
N-(3-thiaoctyl)acrylamide;
N-(7-thianonyl)acrylamide;
N-(6-ethyl-2-methyl-4-thiaoctyl)acrylamide
N-(6-thia-2,4,9-trimethyldecyl)acrylamide;
N-(4-thiadodecyl)acrylamide;
3-thiapentyl acrylate;
bis(2-thiabutyl)methyl acrylate;
methylthioethyl acrylate; and
methacryloylprolylmethionine methyl ester.

The polymers employed as the peptizers in the practice of this invention are generally referred to as "amphiphilic" polymers, which term is, of course, understood to characterize compounds having both polar water-soluble and hydrophobic water-insoluble groups wherein the compound can be put into a stable water solution and also into a stable organic solvent solution. The amphiphilic polymers used in the process of this invention can be characterized as being at least 3% soluble, by weight, in water, which has been adjusted to a pH of less than 5, at room temperature and at least 3%, by weight, soluble in an organic solvent. Preferably, the amphiphilic polymers are at least 3% soluble in acetone.

As set forth above, the polymers employed in the practice of this invention to effect re-coagulation and water removal comprise 90–50% by weight of a polymerized alkyl (alk)acrylate, 10–50% by weight of a polymerized monomer containing at least one ionic group and up to 10% by weight of a polymerized monomer containing at least one active methylene group.

The alkyl (alk)acrylates which can, upon polymerization, form the major proportion of the polymers employed in the practice of this invention have the structure:

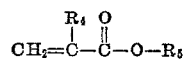

wherein $R_4$ is a hydrogen atom or a lower alkyl group preferably having 1–4 carbon atoms such as, for example, methyl, ethyl, propyl, butyl and the like, preferably methyl and $R_5$ is an alkyl group, preferably one having 1–10 carbon atoms, such as, for example, methyl, ethyl, propyl, butyl, pentyl, hexyl, heptyl, octyl, nonyl, decyl and isomers thereof. It is most preferred that $R_5$ be methyl or ethyl. Accordingly the most preferred alkyl (alk)acrylates for use in the practice of this invention are methyl acrylate, ethyl acrylate, methyl methacrylate and ethyl methacrylate.

The second monomer required to form the polymers employes as re-coagulation and drying agents in the practice of this invention are those containing at least one anionic group. It is preferred that this anionic group be a —COOH group, an —SO$_4$H group, an —SO$_3$H group or a suitable salt of one of these as, for example, a sodium salt, a potassium salt, an ammonium salt, a pyridine salt or the like. As exemplary of those compounds which can be employed can be listed: acrylic acid, methacrylic acid, propacrylic acid, sodium acrylate, ammonium methacrylate, 2-sulfoethyl acrylate, 2-sulfoethyl methacrylate, 3-sodiosulfopropyl acrylate, 3-sodiosulfopropyl methacrylate, ortho-styrene sulfonic acid, para-styrene sulfonic acid, potassium ortho-styrene sulfonate, ethylene sulfonic acid, sodium ethylene sulfonate, 1-propene-2-sulfonic acid, 1-propene-3-sulfonic acid, acryloyloxyethyl sulfate, methacryloyloxyethyl sulfate, acryloyloxymethyl sulfate, methacryloyloxymethyl sulfate, acryloyloxyethyl sulfate pyridine salt, methacryloyloxyethyl sulfate ammonium salt, methacryloyloxyethyl sulfate pyridine salt, and the like. Preferred for use in the practice of this invention are acrylic acid and 2-methacryloyloxyethyl sulfate, pyridine salt.

The polymers employed as the re-coagulation and drying agents of this invention, can, optionally, contain up to 10% by weight of one or more additional polymerized monomeric units. Where such additional units are employed, it is preferred that at least one, and most preferably all, of them have at least one active methylene group. Active methylene groups are methylene groups between activating groups, for example electronegative groups such as carbonyl. Such methylene groups exhibit unusual chemical activity and are said to be "active." Malonic esters, acetoacetic esters, cyanoacetic esters and 1,3 diketones are examples of compounds containing such groups. The active methylene groups are usually separated from the main polymer chain by at least three atoms. A particularly important class of monomers that can be employed in this capacity are acrylic type esters having active methylene groups in the ester moiety or in a substituent alpha to the carbonyl group. Such compounds can be represented by the formula:

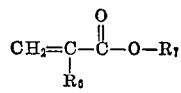

wherein $R_6$ is hydrogen, alkyl or

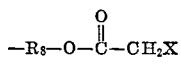

where $R_8$ is alkylene and X is aliphatic acyl or cyano and $R_7$ is alkyl, cycloalkyl, aryl or

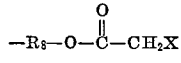

where $R_8$ and X are as defined, provided that one and only one $R_6$ and $R_7$ is always.

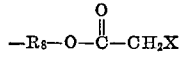

These monomers and polymers which can be prepared therefrom are fully described in U.S. 3,459,790, U.S. 3,488,708 and U.S. 3,554,987, the disclosures of which are incorporated herein by reference.

In the practice of this invention, photographic silver halide emulsions are redispersed twice in non-aqueous media. The non-aqueous media are generally organic solvent media and the non-aqueous medium used for the first re-dispersion must be one which is water miscible. The non-aqueous medium employed in the second re-dispersion step can be either miscible or immiscible with water, as desired.

The term "organic solvent" generally refers to those compounds comprising carbon and hydrogen atoms which generally have boiling points below 165° C. and preferably lower than about 90° C. In certain preferred embodiments of this invention, the amphiphilic polymers are soluble in organic solvents such alcohols, ketones, amides, nitriles, ethers including the cyclic ethers, and the like. Other solvents such as organic acids, organic sulfoxides and organic sulfones can also be used, including mixtures of any of the above organic solvents. Typical useful organic solvents include acetone, N,N-dimethylformamide, methyl alcohol, ethyl alcohol, n-propyl alcohol, isopropyl alcohol, dioxane, dimethylsulfoxide, sulfolane, acetonitrile, tetrahydrofuran, dimethylacetamide, 1,2-dimethoxyethane, acetic acid, triethylamide, and the like.

The process of the invention is very useful in preparing silver chloride, silver bromide, silver iodide, silver bromoiodide, silver chlorobromoiodide, etc., emulsions or mixtures thereof. The emulsions can be coarse-grain or fine-grain and can be prepared by single-jet techniques, double-jet techniques and optionally in the presence of ripening agents such as ammonium, thiocyanates, thioethers, etc., such as emulsions described in U.S. Pats. 2,222,264 by Nietz et al., 3,320,069 by Illingsworth, 3,271,157 by McBride, 2,592,250 by Davey et al., 3,367,778 by Berriman, 3,447,927 by Bacon et al., and the like.

The silver reactant employed in the practice of this invention can be any water soluble silver salt, but is preferably silver nitrate.

The silver halide emulsions prepared, redispersed and dried in accordance with this invention can be coated by those methods which are useful in the art, including dip coating, air knife coating, curtain coating, extrusion coating and the like, with the addition that methods used for organic-solvent coating can also be utilized.

The resulting emulsions prepared by the improved process of this invention can be treated in essentially the same way as other emulsions in the photographic art. For example, they can be chemically or spectrally sensitized, coated with antifoggants, or coated with developing agents; the emulsions can be hardened; binder vehicles can be added thereto including water-soluble polymers, latex polymers, water-insoluble polymers, natural substances such as proteins, and the like; plasticizers lubricants, coating aids, matting agents and brighteners can be coated therewith or in adjacent layers; also, they can generally be chemicaly processed or developed by techniques used in the art, including dry development techniques.

Both the polymers employed as peptizers and the polymers employed as re-coagulation and drying agents in the practice of this invention can be generally polymerized by solution polymerization, emulsion polymerization or bulk polymerization procedures, but they are preferably polymerized by solution polymerization procedures. The polymerization is carried out to obtain a molecular weight of the interpolymer of at least about 10,000 to about 500,000 and preferably from about 30,000 to about 100,000. The inherent viscosities of the interpolymers generally range from about 0.1 to about 2.

The following examples are included for a further understanding of the invention.

EXAMPLE 1

Part A

Prepare 2-methacryloyloxyethyl sulfate, pyridine salt by adding 65.0 g. (0.5 mole) of 2-hydroxyethyl methacrylate and 79.5 g. (0.5 mole) of pyridine-sulfur trioxide complex to 300 ml. of acetone and stirring the resulting dispersion for three hours at room temperature. At the end of that time, remove any material which remains undissolved by filtration. Place the solution in a bottle and store in a freezer until a crystalline solid which dissolves on warming, 2-methyloxyloxyethyl sulfate, pyridine salt, is formed on the walls of the bottle.

Part B

Dissolve 22.5 g. of the product of Part A in 70 ml. of N,N-dimethylformamide and place the solution in a 500 ml. one-necked flask. Add 6.3 g. of 2-acetoacetoxyethyl methacrylate and 33.7 g. of methyl acrylate and 200 additional ml. of N,N-dimethylformamide and degas the resulting solution with nitrogen. Then add 0.5 g. of 2,2'-azobis(2-methylpropionitrile) and place in a bath at 60° C. for about sixteen hours. The product is a clear, viscous solution comprising a polymer of 54/36/10 (by weight) methyl acrylate/2-methacryloyloxyethyl sulfate, pyridine salt/2-acetoacetoxyethyl methacrylate.

Part C

Charge a flask equipped with a reflux condenser with 8.0 g. of 3-thiapentyl acrylate, 25.0 g. of methyl methacrylate, 31.4 g. of 2-(dimethylamino)ethyl methacrylate, 0.32 g. of 2,2'-azobis(2-methylpropionitrile) and 260 ml.

of acetone. Sweep the mixture for ten minutes with nitrogen and place the flask in a 60° C. bath for about sixteen hours.

A polymeric product which is 1/5/4 (mole ratio) 3-thiapentyl acrylate/methyl methacrylate/2 - (N,N-dimethylamino) ethyl methacrylate precipitates. Wash the product with water and dry it under vacuum without heating.

Part D

Dissolve 5.0 g. of the polymer of Part C in 300 ml. of water at pH 5.3 and add 32.8 g. of potassium bromide and 1.0 g. of potassium iodide. Bring the system to 70° C. and, with constant stirring, add a solution of 38.2 g. of silver nitrate in 190 ml. of water at a constant rate over a thirty-minute period. Cool the silver halide suspension thus formed to room temperature. It will remain smoothly dispersed.

Part E

Add enough dilute sodium hydroxide to a 50 g. sample of the aqueous silver halide dispersion of Part D to raise its pH to 7.8. The dispersion will immediately coagulate to form a precipitate which will settle into a pad in the bottom of the vessel. After about 30 minutes, decant the clear, aqueous supernatant, whereupon a firm pad of precipitate will be obtained. Disperse this pad in twenty milliliters of dimethylformamide and add five milliliters of a 20% solution of the polymer of Part B in dimethylformamide, causing the silver halide to precipitate. Decant the supernatant and add twenty milliliters of the 20% solution of the polymer of Part B in dimethylformamide to the precipitated pad, with stirring. A good dispersion of silver halide which can be coated on a support to give a smooth, even coating results.

EXAMPLE 2

Repeat Example 1, but substitute three milliliters of a twenty percent solution of an 80/20 (weight) copolymer of ethyl acrylate/acrylic acid in acetone for the five milliliters of the 20% solution of the polymer of Part B employed therein to re-coagulate the silver halide. After completion of the precipitation of the silver halide, decant the supernatant liquid. Add twenty milliliters of the 20% solution of the 80/20 ethyl acrylate/acrylic acid copolymer in acetone to the precipitated pad, with stirring.

Again, a good dispersion of silver halide which can be coated on a support to give a smooth, even coating results.

EXAMPLE 3

Repeat Example 2, but effect the final re-dispersion of the silver halide with 20 ml. of a 20% solution of the polymer of Example 1, Part B in dimethylformamide. Upon coating on a support, results equivalent to those of Examples 1 and 2 are obtained.

The invention has been described in detail with particular reference to preferred embodiments thereof, but it will be understood that variations and modifications can be effected within the spirit and scope of the invention.

What is claimed is:

1. In a process for preparing a non-aqueous photographic silver halide emulsion comprising:
   (A) introducing the respective silver and halide reactants into an aqueous medium comprising an amphiphilic polymer which comprises units of an (N,N-dialkylamino)alkyl (alk)acrylate;
   (B) coagulating the silver halide out of the liquid medium;
   (C) removing the aqueous liquid and
   (D) redispersing said solids in a water-miscible, non-aqueous medium; the improvement which comprises:
   (E) introducing into the non-aqueous dispersion a polymer comprising:
      (1) about 90–50 percent by weight of units of an alkyl (alk)acrylate,
      (2) about 10–50 percent by weight of units of a monomer containing at least one anionic group, and
      (3) up to about 10 percent by weight of units of monomer containing at least one active methylene group, in a quantity sufficient to re-coagulate the silver halide;
   (F) removing the non-aqueous liquid containing residual moisture; and
   (G) redispersing said silver halide in a non-aqueous medium in the presence of a polymer comprising:
      (1) about 90–50 percent by weight of units of an alkyl (alk)acrylate,
      (2) about 10–50 percent by weight of units of monomer containing at least one anionic group, and
      (3) up to about 10 percent by weight of units of a monomer containing at least one active methylene group, said polymer being present in a quantity great enough to affect said redispersion, said quantity being greater, on a molar basis, than the quantity necessary for said re-coagulation.

2. The improved process of claim 1 further comprising the step of coating the redispersed non-aqueous dispersion onto a support.

3. The improved process of claim 1 wherein said amphiphilic polymer comprises units of an (N,N-dialkylamino)-alkyl (alkylacrylate and units of an alkyl (alkyl)acrylate.

4. The improved process of claim 1 wherein said amphiphilic polymer comprises from about 35 to about 75 mole percent of untis of an alkyl (alkyl)acrylate, from about 25 to about 65 mole percent of units of an (N,N-dialkylamino)alkyl (alkyl)acrylate and up to about 20 mole percent of an ethylenically unsaturated monomer containing groups appended thereto comprising at least one thioether moiety.

5. The improved process of claim 1 wherein the (N,N-dialkylamino)alkyl (alkyl)acrylate is 2-(N,N-dimethylamino)ethyl methacrylate.

6. The improved process of claim 1 wherein the alkyl (alk)acrylate of the polymer of step E is selected from the group consisting of methyl acrylate, methyl methacrylate, ethyl acrylate and ethyl methacrylate.

7. The improved process of claim 1 wherein said anionic group of the polymer of step E is selected from the class consisting of —COOH groups, —SO$_4$H groups, —SO$_3$H groups and salts of the foregoing.

8. The improved process of claim 1 wherein the monomer containing at least one active methylene group is represented by the formula:

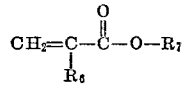

wherein R$_6$ is hydrogen, alkyl or

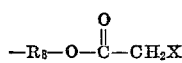

where R$_8$ is alkylene and X is a aliphatic acyl or cyano and R$_7$ is alkyl, cycloalkyl, aryl or

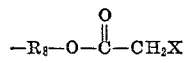

where R$_8$ and X are as defined above, provided that one and only one R$_6$ and R$_7$ is always

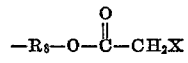

9. The improved process of claim 1 wherein the non-aqueous medium comprises a water-miscible organic liquid selected from the group consisting of alcohols, ketones, amines, nitriles, amides, ethers, cyclic ethers, acids, sulfoxides and sulfones.

10. In a process for preparing a non-aqueous photographic silver halide emulsion comprising:
(A) introducing the respective silver and halide reactants into an aqueous medium comprising an amphiphilic polymer comprising
  (1) from about 35 to about 75 mole percent of units of an alkyl (alk)acrylate,
  (2) from about 25 to about 65 mole percent of units onf an (N,N-dialkylamino)alkyl (alk)acrylate and
  (3) up to about 20 mole percent of an ethylenically unsaturated monomer containing groups appended thereto comprising at least one thioether moiety;
(B) coagulating the silver halide out of the liquid medium;
(C) removing the aqueous liquid; and
(D) redispersing said silver halide in a non-aqueous medium comprising a water-miscible organic liquid selected from the group consisting of alcohols, ketones, amines, nitriles, amides, ethers, cyclic ethers, acids, sulfoxides and sulfones; the improvement which comprises:
(E) introducing into the non-aqueous dispersion a polymer comprising:
  (1) about 90–50 percent by weight of units of an alkyl (alk)acrylate selected from the group consisting of methyl acrylate, methyl methacrylate, ethyl acrylate and ethyl methacrylate,
  (2) about 10–50 percent by weight of units of a monomer containing at least one anionic group selected from the class consisting of —COOH groups, —SO$_4$H groups, —SO$_3$H groups and salts of the foregoing, and
  (3) up to about 10 percent by weight of units of a monomer containing at least one active methylene group represented by the formula:

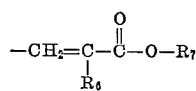

wherein R$_6$ is hydrogen, alkyl or

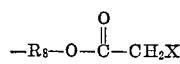

wherein R$_8$ is alkylene and X is aliphatic acyl or cyano and R$_7$ is alkyl, cycloalkyl, aryl or

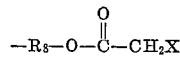

where R$_8$ and X are as defined above, provided that one and only one R$_6$ and R$_7$ is always

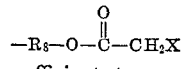

in a quantity sufficient to re-coagulate the silver halide;
(F) removing the non-aqueous liquid containing residual moisture; and
(G) redispersing said silver halide in a non-aqueous medium independently selected from those of (D) above in the presence of a polymer independently selected from those described by (E) above, said polymer being present in a quantity great enough to effect said redispersion, said quantity being greater on a molar basis, than the quantity necessary for said recoagulation.

11. A non-aqueous photographic silver halide emulsion prepared by a process comprising:
(A) introducing the respective silver and halide reactants into an aqueous medium comprising an amphiphilic polymer which comprises units of an (N,N-dialkylamino) alkyl (alk)acrylate;
(B) coagulating the silver halide out of the liquid medium;
(C) removing the aqueous liquid;
(D) redispersing said solids in a water-miscible, non-aqueous medium;
(E) introducing into the non-aqueous dispersion a polymer comprising:
  (1) about 90–50% by weight of units of a alkyl (alk)acrylate,
  (2) about 10–50% by weight of units of a monomer containing at least one anionic group and
  (3) up to 10% by weight of units of a monomer containing at least one active methylene group, in a quantity sufficient to re-coagulate the silver halide;
(F) removing the non-aqueous liquid containing residual moisture; and
(G) redispersing said silver halide in a non-aqueous medium in the presence of a polymer comprising:
  (1) about 90–50% by weight of units of an alkyl (alk)acrylate,
  (2) about 50–10% by weight of units of a monomer containing at least one anionic group, and
  (3) up to about 10% by weight of units of a monomer containing at least one active methylene group, said polymer being present in a quantity great enough to effect said redispersion, said quantity being greater, on a molar basis, than the quantity necessary for said re-coagulation.

12. A non-aqueous photographic silver halide emulsion prepared by a process comprising:
(A) introducing the respective silver and halide reactants into an aqueous medium comprising an amphiphilic polymer comprising:
  (1) from about 35 to about 75 mole percent of units of an alkyl (alk)acrylate,
  (2) from about 25 to about 65 mole percent of units of an (N,N-dialkylamino)alkyl (alk)acrylate and
  (3) up to about 20 mole percent of an ethylenically unsaturated monomer containing groups appended thereto comprising at least one thioether moiety;
(B) coagulating the silver halide out of the liquid medium;
(C) removing the aqueous liquid; and
(D) redispersing said silver halide in a non-aqueous medium comprising a water-miscible organic liquid selected from the group consisting of alcohols, ketones, amines, nitriles, amides, ethers, cyclic ethers, acids, sulfoxides and sulfones;
(E) introducing into the non-aqueous dispersion a polymer comprising:
  (1) about 90–50 percent by weight of units of an alkyl (alk)acrylate selected from the group consisting of methyl acrylate, methyl methacrylate, ethyl acrylate and ethyl methacrylate,
  (2) about 10–50 percent by weight of units of a monomer containing at least one anionic group selected from the class consisting of —COOH groups, —SO$_4$H groups, —SO$_3$H groups and salts of the foregoing, and
  (3) up to about 10 percent by weight of units of a monomer containing at least one active methylene group represented by the formula:

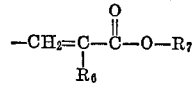

where R$_6$ is hydrogen, alkyl or

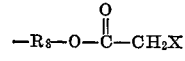

where R$_8$ is alkylene and X is aliphatic acyl or cyano and R$_7$ is alkyl, cycloalkyl, aryl or

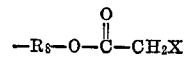

where $R_8$ and X are as defined above, provided that one and only one $R_6$ and $R_7$ is always:

$$-R_8-O-\overset{\overset{O}{\|}}{C}-CH_2X$$

in a quantity sufficient to re-coagulate the silver halide;

(F) removing the non-aqueous liquid containing residual moisture; and (G) redispersing said silver halide in a non-aqueous medium independently selected from those of (D) above in the presence of a polymer independently selected from those described by (E) above, said polymer being present in a quantity great enough to effect said redispersion, said quantity being greater, on a molar basis, than the quantity necessary for said re-coagulation.

13. A photographic element comprising a support having coated thereon an emulsion prepared by a process comprising:

(A) introducing the respective silver and halide reactants into an aqueous medium comprising an amphiphilic polymer which comprises units of an (N,N-dialkylamino)alkyl (alk)acrylate;

(B) coagulating the silver halide out of the liquid medium;

(C) removing the aqueous liquid;

(D) redispersing said solids in a water-miscible, non-aqueous medium;

(E) introducing into the non-aqueous dispersion a polymer comprising:

(1) about 90–50% by weight of units of an alkyl (alk)acrylate, (2) about 10–50% by weight of units of a monomer containing at least one anionic group and (3) up to about 10% by weight of units of a monomer containing at least one active methylene group, in a quantity sufficient to re-coagulate the silver halide;

(F) removing the non-aqueous liquid containing residual moisture; and (G) redispersing said silver halide in a non-aqueous medium in the presence of a polymer comprising:

(1) about 90–50% by weight of units of an alkyl (alk)acrylate, (2) about 50–10% by weight of units of a monomer containing at least one anionic group, and (3) up to about 10% by weight of units of a monomer containing at least one active methylene group, said polymer being present in a quantity great enough to effect said redispersion, said quantity being greater, on a molar basis, than the quantity necessary for said re-coagulation.

14. A photographic element comprising a support having coated thereon an emulsion prepared by a process comprising:

(A) introducing the respective silver and halide reactants into an aqueous medium comprising an amphiphilic polymer comprising:

(1) from about 35 to about 75 mole percent of units of an alkyl (alk)acrylate, (2) from about 25 to about 65 mole percent of units of an N,N(-dialkylamino)alkyl (alk)acrylate and (3) up to about 20 mole percent of an ethylenically unsaturated monomer containing groups appended thereto comprising at least one thioether moiety;

(B) coagulating the silver halide out of the liquid medium;

(C) removing the aqueous liquid; and (D) redispersing said silver halide in a non-aqueous medium comprising a water-miscible organic liquid selected from the group consisting of alcohols, ketones, amines, nitriles, amides, ethers, cyclic ether acids, sulfoxides and sulfones;

(E) introducing into the non-aqueous dispersion a polymer comprising:

(1) about 90–50 percent by weight of units of an alkyl (alk)acrylate selected from the group consisting of methyl acrylate, methyl methacrylate, ethyl acrylate and ethyl methacrylate, (2) about 10–50 percent by weight of units of a monomer containing at least one anionic group selected from the class consisting of —COOH groups, —SO$_4$H groups, —SO$_3$H groups and salts of the foregoing, and (3) up to about 10 percent by weight of units of a monomer containing at least one active methylene group represented by the formula:

$$-CH_2=\underset{\underset{R_6}{|}}{C}-\overset{\overset{O}{\|}}{C}-O-R_7$$

where $R_6$ is hydrogen, alkyl or $$-R_8-O-\overset{\overset{O}{\|}}{C}-CH_2X$$

where $R_8$ is alkylene and X is aliphatic acyl or cyano and $R_7$ is alkyl, cycloalkyl, aryl or $$-R_8-O-\overset{\overset{O}{\|}}{C}-CH_2X$$

where $R_8$ and X are as defined above, provided that one and only one $R_6$ and $R_7$ is always:

$$-R_8-O-\overset{\overset{O}{\|}}{C}-CH_2X$$

in a quantity sufficient to re-coagulate the silver halide;

(F) removing the non-aqueous liquid containing residual moisture; and (G) redispersing said silver halide in a non-aqueous medium independently selected from those of (D) above the presence of a polymer independently selected from those described by (E) above, said polymer being present in a quantity great enough to effect said redispersion, said quantity being greater, on a molar basis, than the quantity necessary for said re-coagulation.

References Cited
UNITED STATES PATENTS 2,772,165    11/1956    Moede    96—114
3,679,425    7/1972    Hollister    96—114

RONALD H. SMITH, Primary Examiner